(12) United States Patent
Javaheri (10) Patent No.: US 10,174,849 B2
(45) Date of Patent: Jan. 8, 2019

(54) MULTIPLE STAGE PINCH VALVE AND FILLING APPARATUS USING A MULTIPLE STAGE PINCH VALVE

(71) Applicant: Festo Corporation, Hauppauge, NY (US)

(72) Inventor: Majid Javaheri, Hauppauge, NY (US)

(73) Assignee: Festo Corporation, Hauppauge, NY (US)

( * ) Notice: Subject to any disclaimer, the term of this patent is extended or adjusted under 35 U.S.C. 154(b) by 244 days.

(21) Appl. No.: 14/972,426

(22) Filed: Dec. 17, 2015

(65) Prior Publication Data

US 2016/0178071 A1   Jun. 23, 2016

Related U.S. Application Data

(60) Provisional application No. 62/093,579, filed on Dec. 18, 2014.

(51) Int. Cl.
| | | |
|---|---|---|
| *F16K 7/07* | (2006.01) | |
| *B65D 90/56* | (2006.01) | |
| *B65D 47/06* | (2006.01) | |
| *B67D 3/04* | (2006.01) | |
| *B65G 53/46* | (2006.01) | |
| *B65D 47/20* | (2006.01) | |

(52) U.S. Cl.
CPC ............ *F16K 7/075* (2013.01); *B65D 47/066* (2013.01); *B65D 47/2031* (2013.01); *B65D 90/56* (2013.01); *B65G 53/4675* (2013.01); *B67D 3/041* (2013.01); *F16K 7/07* (2013.01); *Y10T 137/87338* (2015.04); *Y10T 137/87434* (2015.04)

(58) Field of Classification Search
CPC ..... Y10T 137/87338; Y10T 137/87434; F16K 7/07; F16K 7/075; B65D 90/56; B65D 47/066; B65D 47/2031; B65G 53/4675; B67D 3/041
See application file for complete search history.

(56) References Cited

U.S. PATENT DOCUMENTS

| 3,443,609 | A | * | 5/1969 | Wehren | ..................... B65B 1/18 |
| | | | | | 138/45 |
| 3,693,841 | A | * | 9/1972 | Hansen | .................. B65D 90/56 |
| | | | | | 222/195 |
| 2010/0132832 | A1 | * | 6/2010 | Neumayer | .............. B67C 3/242 |
| | | | | | 141/83 |
| 2011/0186757 | A1 | * | 8/2011 | Kawamura | ............... B67C 3/28 |
| | | | | | 251/5 |
| 2014/0077107 | A1 | | 3/2014 | Berwanger et al. | |

FOREIGN PATENT DOCUMENTS

EP        2682652        1/2014

* cited by examiner

*Primary Examiner* — Atif Chaudry
(74) *Attorney, Agent, or Firm* — Steven Zuschlag (57) ABSTRACT

A multiple stage pinch valve generally includes a pinch valve body, a manifold top head connected to a proximal end of the pinch valve body and a nozzle head connected to a distal end of the pinch valve body. In one embodiment, the pinch valve body includes a first pinch valve section and a second pinch valve section disposed downstream of the first pinch valve section. In another embodiment, the pinch valve body includes an inner pinch valve section and an outer pinch valve section disposed coaxially around the inner pinch valve section.

15 Claims, 9 Drawing Sheets

MULTIPLE STAGE PINCH VALVE AND FILLING APPARATUS USING A MULTIPLE STAGE PINCH VALVE

CROSS-REFERENCE TO RELATED APPLICATIONS

This application claims the benefit of U.S. Provisional Application No. 62/093,579, filed on Dec. 18, 2014, the specification of which is incorporated by reference herein in its entirety for all purposes.

BACKGROUND

Industrial bottle filling processes typically require high performance capital equipment. This equipment must be highly reliable, compact, low cost, low maintenance, and precise. A typical apparatus for filling large volumes of bottles in such environments includes a filler valve to reliably fill bottles with a high accuracy of less than 1% of the fill volume in a matter of few seconds in a clean process without spill. Fast filling is required for high throughput and fast payback of capital investment. Cleanliness is needed to meet increasingly stringent health standards, in particular when dealing with dairy fluids. In this case, any spills may develop harmful bacteria in the filling system environment, which in turn may violate health standards.

Filling accuracy is important for cost control. A lower than advertised fill weight may violate weight and measure laws. Overfill, which is often done to avoid violations, results in material waste and overflow spill. Compactness is needed to lower the filling system size and reduce its footprint. Finally, a low cost for a single valve is required since a typical high performance filling system may have well over hundred filler valves.

Thus, the main problem in the general requirements of a high performance valve, for a bottle filling system, is the following conflicting demands: 1) High filling rate; and 2) High filling precision.

One possible solution towards satisfying these requirements is to use a single stage pinch valve. A single stage pinch valve assembly typically contains an elastic tube, through which the filling fluid flows. The elastic tube is installed within a solid tube. When air, or other actuator, is applied between the inner surface of the solid tube and the outer surface of the elastic tube, the elastic tube is compressed to close the fluid flow passage, thereby stopping the flow of fluid through the valve.

EP2682652 discloses a pinch valve that has a deformable tubular valve element, which defines a main fluid flow channel. A rigid tube is also provided within the main channel for providing a second fluid flow channel. An actuating structure is provided to deform the valve element to alternately open and close the main fluid flow channel. To close the main fluid flow channel, the tubular valve is deformed to fit closely against a valve seat surface provided on the outer surface of the rigid tube. While this valve allows the flow of two fluids, there are no provisions provided for stopping the flow of the second fluid flow channel within the rigid tube.

While such valves are compact and low cost, they do not solve the conflict between high filling rate and high fill height precision. Such valves can also generate either slow flow at high accuracy or high flow at a lower accuracy.

Another solution is a mechanically actuated valve. A cam-operated mechanism raises the empty bottle so that the neck of the bottle is sealed against the valve and a ball check valve is the only passage for venting air from the bottle while fluid fills it up. The rising fluid level in the bottle reaches the ball float and raises it to close the vent, hence closing the flow of fluid. One typical problem with this solution is low reliability due to possible mechanical failure of the cam mechanism, and mechanical valve. Another problem is fluid spillage inherent in vent-controlled filling with mechanical valves resulting in fluid wasted as much as 6% of fill volume and providing a good breeding ground for bacterial growth.

There is therefore a need to improve the design of prior art filling system valves.

SUMMARY OF THE INVENTION

The multiple stage pinch valve according to one aspect of the present invention generally includes a pinch valve body, a manifold top head connected to a proximal end of the pinch valve body and a nozzle head connected to a distal end of the pinch valve body. The pinch valve body includes a first pinch valve section and a second pinch valve section disposed downstream of the first pinch valve section.

The first pinch valve section has a proximal end connected to the manifold top end and a distal end opposite the proximal end. The first pinch valve section further includes a tubular first valve element and a rigid flow tube supported within the first valve element. The rigid flow tube defines an inner fluid flow path and an outer fluid flow path is defined between the first valve element and the rigid flow tube. The first valve element is deformable to radially seal around an outer surface of the rigid flow tube thereby closing the outer fluid flow path.

The second pinch valve section has a proximal end connected to the distal end of the first pinch valve section and a distal end, opposite the proximal end, connected to the nozzle head. The second pinch valve element defines a fluid flow channel therein, which communicates with the inner fluid flow path and the outer fluid flow path of the first pinch valve section. The second valve element is radially deformable to close the fluid flow channel, thereby stopping a flow of fluid through the valve.

In a preferred embodiment, the first pinch valve section is releasably coupled to the second pinch valve section. In this embodiment, a radial clamp is provided and each of the distal end of the first pinch valve section and the proximal end of the second pinch valve section is provided with a flange having a sloped cam surface. The radial clamp engages the cam surfaces to press the first and second valve sections together in the axial direction.

The pinch valve body further preferably includes a centralizer support supported between the first and second pinch valve sections, wherein the centralizer support supports a distal end of the rigid flow tube. The centralizer support is preferably a generally circular disc-shaped element having an outer ring connected to a concentric inner ring via a plurality of radial ribs. The inner ring receives the distal end of the rigid flow tube, and at least one flow opening is provided through the centralizer support to permit fluid flow between the outer fluid flow path of the first pinch valve section and the fluid flow channel of the second pinch valve section.

The rigid flow tube is preferably supported at a proximal end thereof within the manifold top head. The manifold top head preferably includes a fluid inlet port and an interior fluid chamber communicating with the fluid inlet port. In this case, the rigid flow tube includes at least one radial aperture formed through its circumferential wall adjacent the proximal end for providing fluid communication between the manifold top head fluid chamber and the inner fluid flow path within the rigid flow tube. Also, the interior fluid chamber of the manifold top head further communicates with the outer fluid flow path defined in the first pinch valve section.

In a preferred embodiment, each of the first and second valve elements is radially deformable by an application of compressed air between an inner surface of the pinch valve body and an outer radial surface of a respective valve element. In addition, each of the first and second valve elements is elastically deformable between a neutral state for permitting a fluid flow and a closed state for stopping a fluid flow.

The nozzle head preferably includes an outlet and a coarse mesh streamliner supported in the outlet. The outlet is in fluid communication with the fluid flow channel of the second pinch valve section and the streamliner includes an outer circular rim, an inner circular rim and a plurality of radial ribs defining a plurality of openings through the streamliner for providing a laminar flow of fluid out of the nozzle head.

The present invention further involves a method for controlling fluid flow through a multiple stage pinch valve as described above. The method includes the steps of allowing fluid to flow through the inner and outer fluid flow paths of the first pinch valve section and through the fluid flow channel of the second pinch valve section to create a fast flow rate of fluid through the valve. Next, the first valve element is deformed to radially seal around the outer surface of the rigid flow tube, thereby closing the outer fluid flow path of the first pinch valve section, wherein fluid is still permitted to flow through the inner fluid flow path of the first pinch valve section and through the fluid flow channel of the second pinch valve section to create a slow flow rate of fluid through the valve, wherein the slow flow rate is less than the fast flow rate. Finally, the second valve element is deformed to close the fluid flow channel in the second pinch valve section to stop all fluid flow through the valve.

The multiple stage pinch valve according to the present invention can be utilized as part of a bottle filling apparatus. The bottle filling apparatus further includes a source of fluid connected to the manifold top head, a source of compressed air connected to the pinch valve body for activating the valve elements and a bottle clamping bracket disposed adjacent the nozzle head for positioning a bottle for filling.

The bottle filling apparatus further preferably includes a bottle detection sensor, positioned at the bottle clamping bracket for detecting the presence of a bottle in the bracket, and a bottle fill sensor positioned at the bottle clamping bracket for detecting a level of fluid within a bottle held in the bracket.

In an alternative embodiment, the multiple stage pinch valve according to the present invention includes a pinch valve body, a manifold top head connected to a proximal end of the pinch valve body and a nozzle head connected to a distal end of the pinch valve body, wherein the pinch valve body includes an inner pinch valve section and an outer pinch valve section disposed coaxially around the inner pinch valve section.

The inner pinch valve section has a proximal end connected to the manifold top head and a distal end opposite the proximal end. The inner pinch valve section further includes a housing, a tubular inner valve element supported coaxially within the housing, and a rigid flow tube supported coaxially within the inner valve element. The rigid flow tube defines an inner fluid flow path and a middle fluid flow path is defined between the inner valve element and the rigid flow tube. The inner valve element is deformable to radially seal around an outer surface of the rigid flow tube, thereby closing the middle fluid flow path.

The outer pinch valve section has a proximal end connected to the manifold top head and a distal end opposite the proximal end. The outer pinch valve section further includes a tubular outer valve element defining an outer fluid flow path between an inner surface of the outer valve element and an outer surface of the inner pinch valve section housing. The outer valve element is deformable to radially seal around the outer surface of the inner pinch valve section housing, thereby closing the outer fluid flow path.

In this alternative embodiment, the pinch valve body may further include a downstream pinch valve section having a proximal end connected at the distal end of the outer pinch valve section and a distal end, opposite the proximal end, connected to the nozzle head. The downstream pinch valve section includes a tubular downstream valve element defining a fluid flow channel therein. This fluid flow channel communicates with each of the inner and middle fluid flow paths of the inner pinch valve section and the outer fluid flow path of the outer pinch valve section. The downstream valve element is radially deformable to close the fluid flow channel.

Thus, the present invention provides a multiple stage pinch valve that improves the performance of prior art filling valves. The present invention is a compact and reliable multiple stage pinch valve with high performance capacity of filling bottles at high accuracy combined with a high filling rate. For example, with a 500 ml bottle, this means continuously achieving filling accuracy of ±1% of the target volume, in less than 4.5 sec.

With virtually no moving parts the highly reliable valve reduces maintenance downtime and further reduces the cost of ownership while increasing productivity. Increased productivity allows the end user to expedite the return on investment, while high accuracy results in a cleaner operation with virtually no spill and optimal fill utilization without the risk of costly overfill or a risk of law violations with an under fill.

It is believed that readers who are familiar with the trade will understand the description in this document and will appreciate its value. The description in this document is written in general terms and do not imply any restriction to any specific method or component, which were described. All components and methods, which are described in this document, are used as an example only to allow the reader to appreciate their function.

The preferred embodiments of the multiple stage pinch valve assembly, as well as other objects, features and advantages of this invention, will be apparent from the following detailed description, which is to be read in conjunction with the accompanying drawings. The scope of the invention will be pointed out in the claims.

BRIEF DESCRIPTION OF THE DRAWINGS

FIG. 4a is a cross-sectional view of the centralizer support shown in FIG. 4, taken along line 4a-4a.

DETAILED DESCRIPTION OF THE PREFERRED EMBODIMENTS

Figure 1:
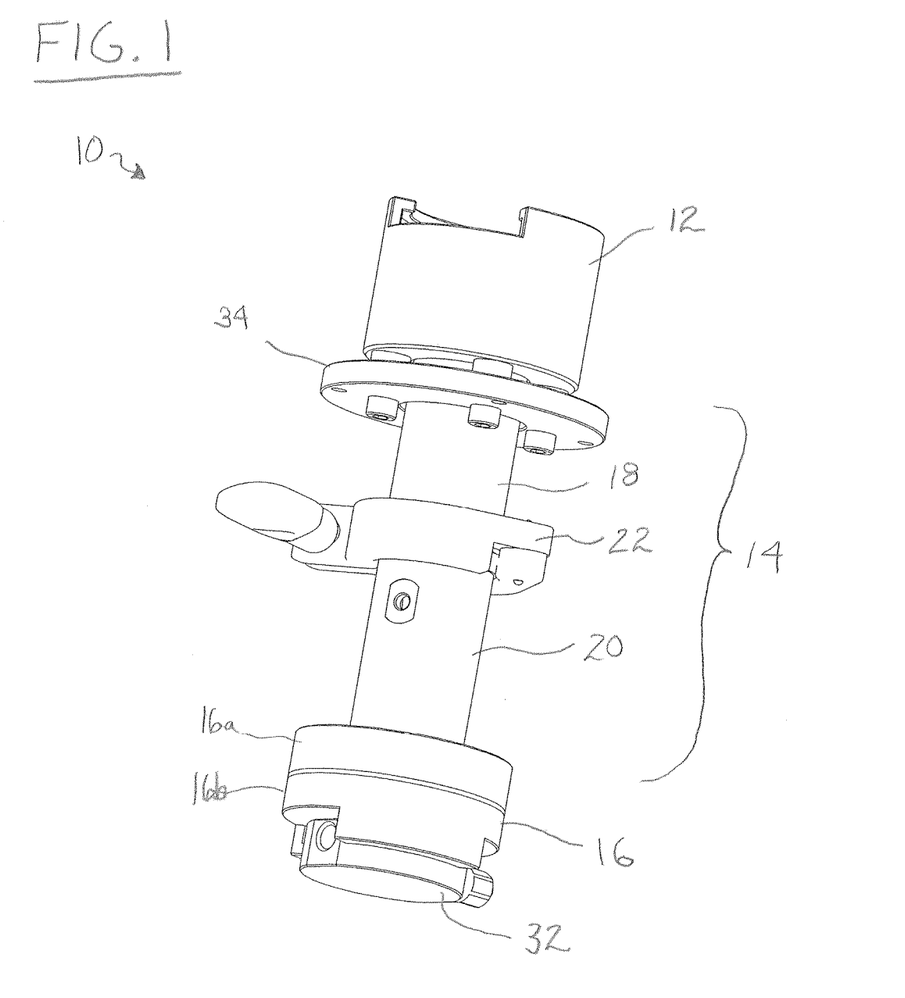
FIG. 1 is a perspective view of the multiple stage pinch valve formed in accordance with the present invention.

A multiple stage pinch valve 10 formed in accordance with the present invention is shown in FIG. 1. The valve 10 generally includes a manifold top head 12, a pinch valve body 14 and a nozzle head 16. As will be discussed in further detail below, the pinch valve body 14 includes a first pinch valve section 18, coupled to the manifold top head 12, and a second pinch valve section 20, downstream of the first pinch valve section and coupled to the nozzle head 16.

Figure 2:
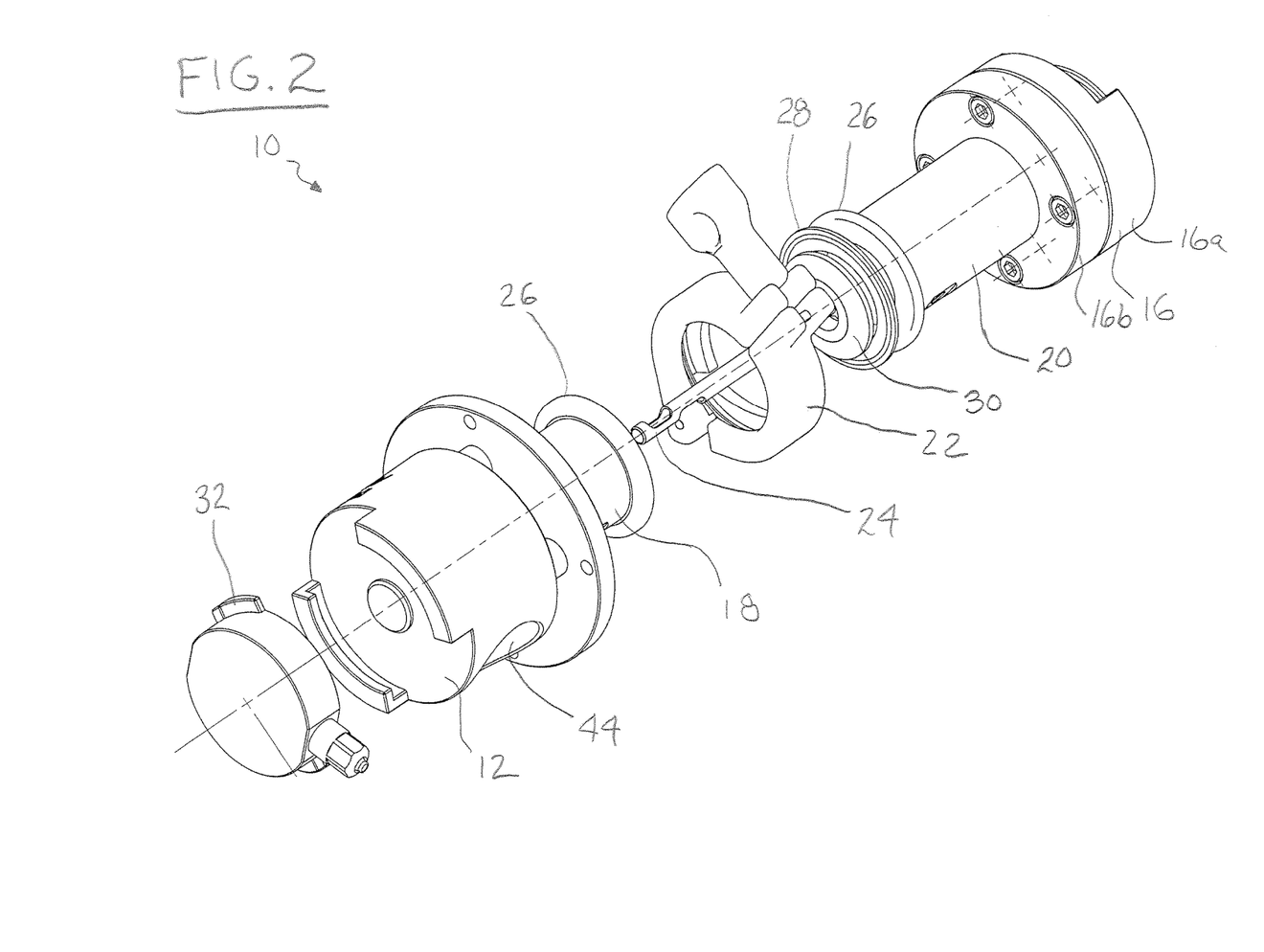
FIG. 2 is an exploded view of the multiple stage pinch valve shown in FIG. 1.

Referring additionally to FIG. 2, the two pinch valve sections 18, 20 may be contained within a single contiguous housing, or, in a preferred embodiment, are releasably coupled together by a clamp 22. In particular, the respective ends of the two pinch valve sections 18, 20 that face each other are preferably formed with a flange 26 having a sloped cam surface that engages an inner cam surface on the clamp 22. As the clamp 22 is tightened, the diameter of the circular opening defined by the clamp is reduced thereby causing the cam surfaces to engage. Engagement of the cam surfaces forces the two pinch valve sections 18, 20 to be pressed against each other in the axial direction. Suitable gaskets 28 are provided between the two pinch valve sections 18, 20 and the clamp 22 to ensure a fluid tight seal.

As will be discussed in further detail below, a flow tube 24 extends within the first pinch valve section 18 and is supported at one end by the manifold top head 16 and at its opposite end by a centralizer support 30. FIGS. 1 and 2 also show a "clean-in-place" (CIP) cup 32 that is attached to the nozzle head 16 for forcing a cleaning fluid through the pinch valve 10 during a cleaning operation, as shown in FIG. 1, or can be conveniently stored on top of the manifold top head 12 when not in use, as shown in FIG. 2.

The pinch valve 10 may further include a mounting bracket 34 for securing the valve to a filling system. Also, the nozzle head 16 may consist of a top half 16a and a bottom half 16b fastened together through a flanged joint with a gasket in between, and firmly connected with four stainless steel bolts.

Figure 3A:
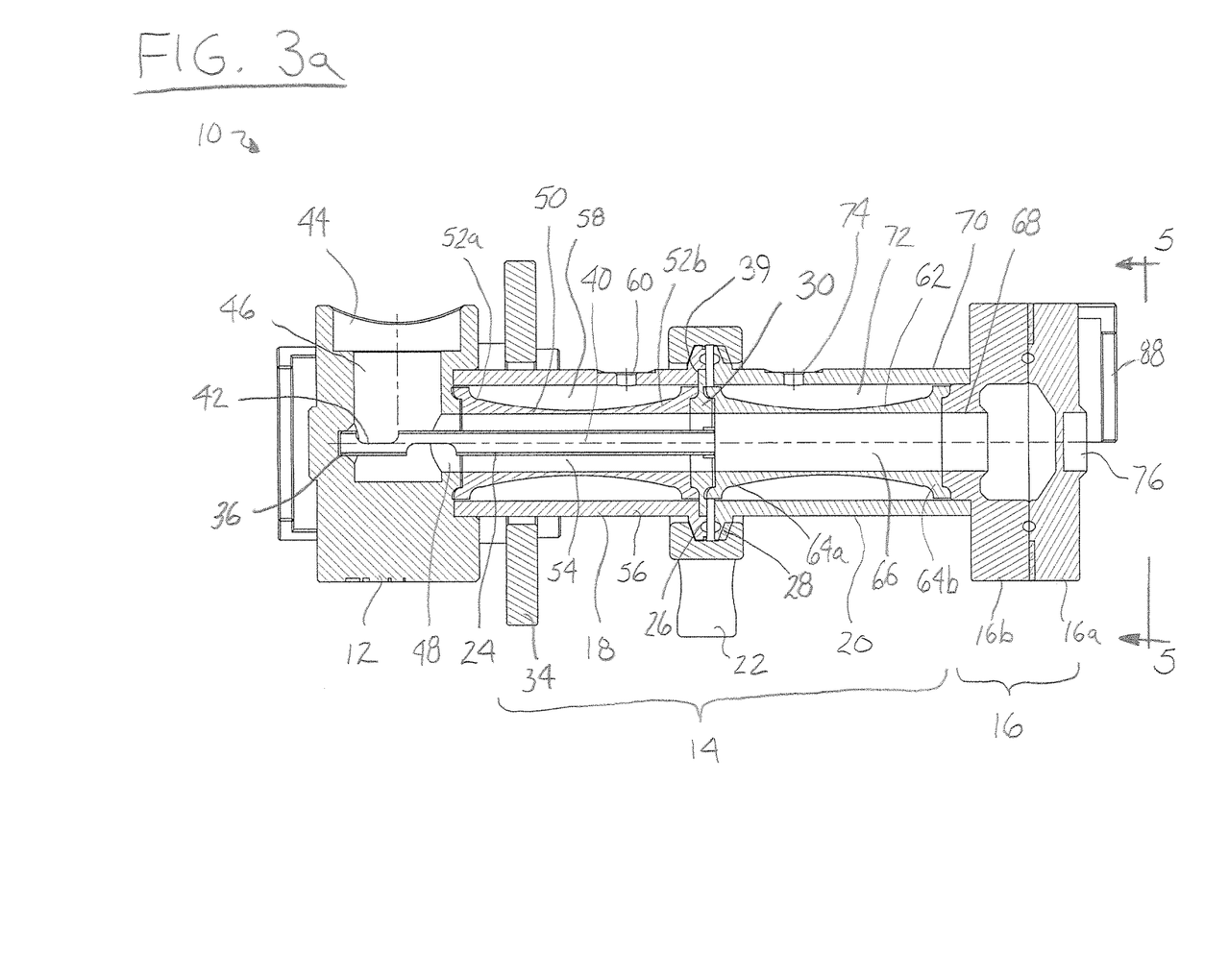
FIG. 3a is a cross-sectional view of the multiple stage pinch valve shown in FIG. 1 in a fully open position.
Figure 3B:
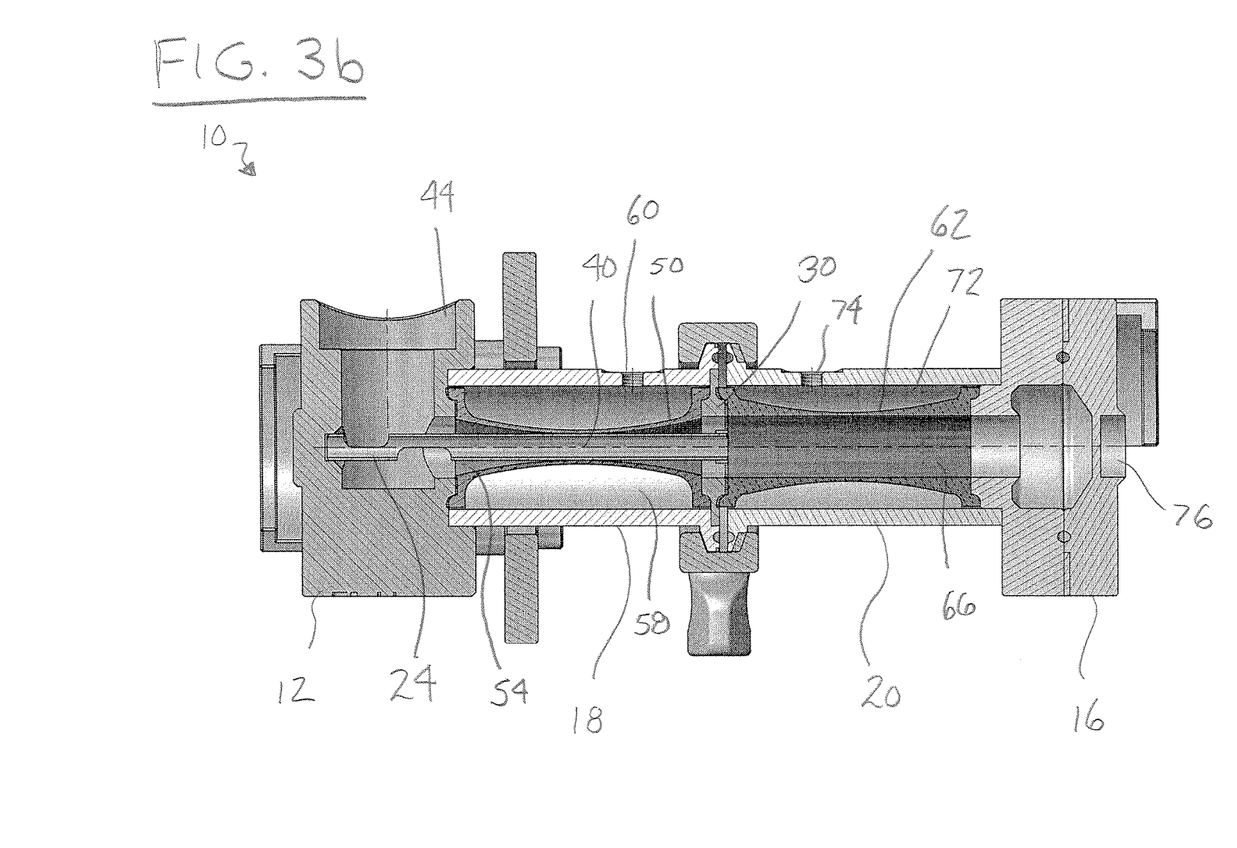
FIG. 3b is a cross-sectional view of the multiple stage pinch valve shown in FIG. 1 showing the first pinch valve section in a closed position and the second pinch valve section in an open position.
Figure 3C:
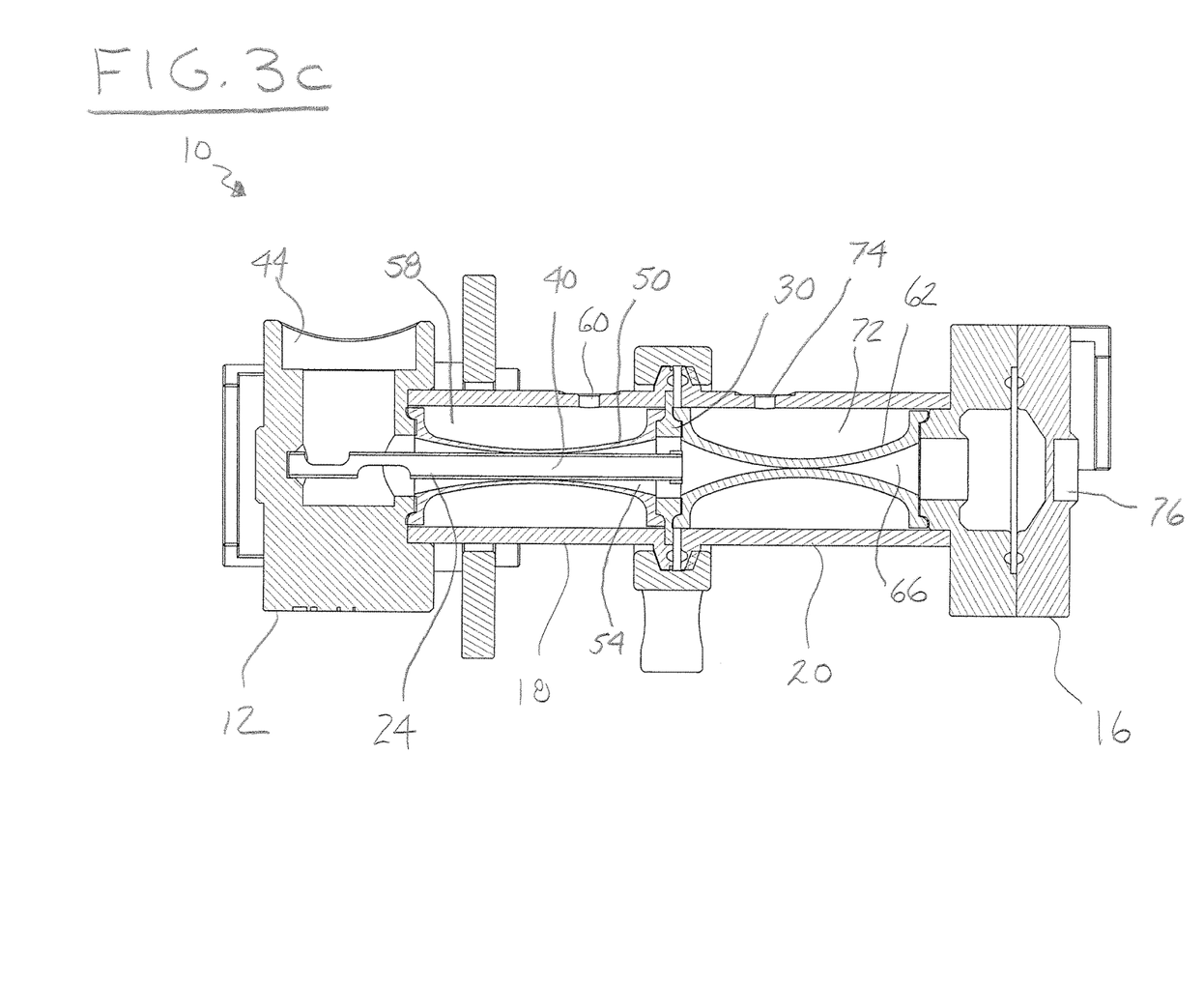
FIG. 3c is a cross-sectional view of the multiple stage pinch valve shown in FIG. 1 showing both the first pinch valve section and the second pinch valve section in a closed position.
Figure 4:
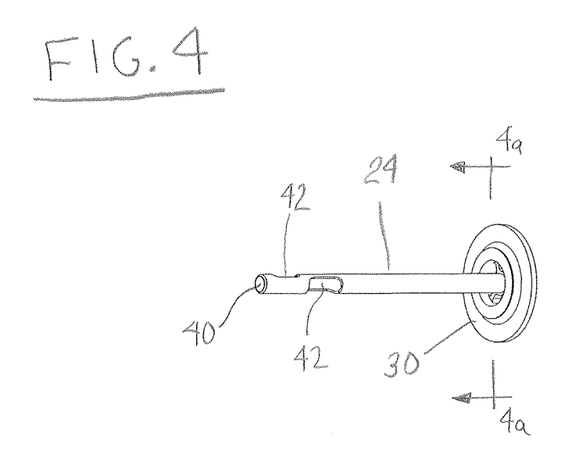
FIG. 4 is an isolated perspective view of the internal flow tube of the multiple stage pinch valve shown in FIG. 1.
Figure 4A:
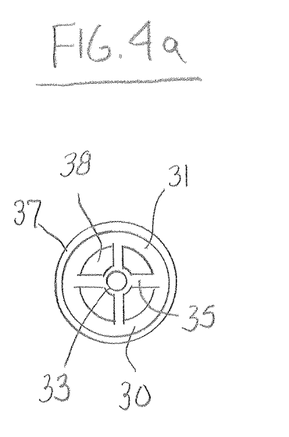

Referring additionally to FIGS. 3a, 3b, 3c, 4 and 4a, the flow tube 24 is fixed at one end within a blind hole 36 formed in an inner surface of the manifold head 12. At its opposite end, the flow tube is supported by the centralizer support 30. The centralizer support 30 can take various forms. It can be an integral or permanently fixed part of the flow tube 24, as shown in FIGS. 4 and 4a so that the flow tube 24 and the centralizer support 30 can be easily installed in the first pinch valve section 18 as one unit. Alternatively, the centralizer support 30 can be integrally formed as part of either the first pinch valve section 18 or the second pinch valve section 20 or it can be a separate component that is attached to either section or simply trapped between the sections upon assembly. In the embodiment where the first and second pinch valve sections are formed as one unit, the centralizer support 30 can be a contiguous portion of the inner pinch valve housing or can be otherwise fixed between the two pinch valve sections.

In all of the above-described embodiments, the centralizer support 30 includes structure for positioning the opposite end of the flow tube 24 generally along a center line of the first and second pinch valve sections 18, 20. The centralizer support 30 further includes at least one opening 38 provided entirely through the thickness of the support to permit fluid flow between the first and second pinch valve sections 18, 20.

For example, in a preferred embodiment, as shown in FIGS. 4 and 4a, the centralizer support 30 is a generally circular disc-shaped element having an outer ring 31 connected to a concentric inner ring 33 via a plurality of radial ribs 35. The outer ring 31 may be formed with a radial flange 37 that is received in a recess 39 of one or both of the first and second pinch valve sections 18, 20 for retaining the centralizer support 30 in its axial position between the two sections. The inner ring 33 defines an aperture for receiving the distal end of the flow tube 24. Flow through openings 38 are defined between the inner and outer rings and are separated by the radial ribs 35.

The flow tube 24 defines an inner fluid conduit 40 extending axially along its length and is further provided with at least one radial aperture 42 formed through its circumferential wall for providing fluid communication with the inner fluid conduit. The radial aperture 42 is formed in the section of the flow tube 24 residing within the manifold head 12 so that fluid entering the manifold head via an inlet port 44 of the manifold head can enter the inner fluid conduit 40 of the flow tube. Fluid entering the inner fluid conduit 40 of the flow tube 24 thus travels through the first pinch valve section 18 into the second pinch valve section 20.

The manifold top head 12 is further formed with a fluid chamber 46 extending between the inlet port 44 and an outlet port 48 of the manifold head. The fluid chamber 46 and the outlet port 48 of the manifold head 12 are sized so as to form an outer fluid flow path surrounding the flow tube 24. The outlet port 48 communicates with the interior of the first pinch valve section 18 so that two fluid flow paths are provided through the first pinch valve section. An inner fluid flow path is provided through the inner fluid conduit 40 of the flow tube 24 and an outer fluid flow path is provided outside of the flow tube 24.

The first pinch valve section 18 is configured to open or close the cross-section of flow for the flow medium in the outer fluid flow path. In this regard, the first pinch valve section 18 is able to provide a closed position in which any flow through the outer fluid flow path is completely prevented from passing through (FIGS. 3b and 3c), and an open position in which the flow cross-section through the outer fluid flow path is maximally wide (FIG. 3a).

The first pinch valve section 18 has an elastic hose-like valve element 50 with a longitudinal axis and extending, preferably, over the full length of the first pinch valve section 18. This first valve element 50 has two end sections 52a, 52b that are axially disposed opposite of each other and interspersed by a valve element channel 54, which opens at one end with the outlet port 48 of the manifold head 12, and which opens at its opposite end with the through openings 38 formed in the centralizer support 30. The valve element channel 54 of the valve element 50, together with the outer surface of the flow tube 24, defines the outer fluid flow path of the first pinch valve section.

The wall area of the valve element 50 is radially flexible with regard to the longitudinal axis. This elastic deformability relates particularly to a control area that is generally disposed mid-way along the length of the first pinch valve section 18. However, the valve element 50 preferably has rubber-elastic properties throughout its full length.

In the neutral state, which is when no radial force is applied from the outside, the first valve element 50 has a configuration wherein the channel 54 of the valve element 50 is continuously open.

The hose-like first valve element 50 is coaxially enclosed within a rigid first pinch valve section housing 56. The housing 56 is a cylindrical member extending coaxially with the first valve element 50 along the length of the first pinch valve section 18. An actuating chamber 58 is defined between the outer radial surface of the first valve element 50 and an inner surface of the first housing 56. This actuating chamber 58 communicates with a first actuating fluid inlet 60 formed through the first housing. As will be discussed in further detail below, an actuating fluid supplied to the first actuating chamber 58 via the inlet 60 will increase pressure within the chamber, thereby causing the elastic valve element 50 to radially deform in an inward direction toward the flow tube. With further increase of pressure within the actuating chamber, the first valve element 50 will radially seal around the outer surface of the rigid flow tube 24 so as to completely close the outer fluid flow channel 54. As air pressure is relaxed the elastomeric valve material of the first valve element 50 relaxes and returns to its neutral state allowing the fluid to continue its flow through the outer fluid flow channel 54.

The preferably flange-shaped end sections 52a, 52b of the valve element 50 are respectively received in annular recesses of the manifold head 12 and the centralizer support 30 in a fluid-tight manner to radially and axially seal the valve element. In this manner, a fluid-tight transition is provided between the channel 54 of the valve element 50 and both the outlet 48 of the manifold 12 and the centralizer support 30.

The first valve section housing 56 is connected at one end to the manifold head 12. Such connection can be achieved via a press-fit connection within a bore formed in the manifold 12, or by any other suitable manner. As discussed above, the opposite end of the housing 56 is provided with a flange 26 having a sloped cam surface that engages an inner cam surface on the clamp 22 so that the two pinch valve sections can be clamped together in the axial direction. Thus, the manifold head 12, the housing 56, the second pinch valve section 20 and the nozzle 16 constitute one rigid unit.

The second pinch valve section 20 is situated immediately downstream of the first pinch valve section 18. The second pinch valve section 20 may be attached to the first pinch valve section 18, as described above, or it may simply be a downstream portion of a contiguous two-section pinch valve housing. In any case, the second pinch valve section 20 is similar in most respects to the first pinch valve section 18 with the exception that the second pinch valve section does not include a flow through tube 24.

The second pinch valve section 20 is configured to open or close the flow of fluid entering the second pinch valve section from the first pinch valve section. In this regard, the second pinch valve section 20 is able to provide a closed position in which any flow through either the outer fluid flow path or inner fluid flow path is completely prevented from passing through (FIG. 3c), and an open position in which the flow cross-section is maximally wide (FIGS. 3a and 3b).

Like the first pinch valve section 18, the second pinch valve section 20 has an elastomeric hose-like valve element 62 with a longitudinal axis and extending, preferably, over the full length of the second pinch valve section 20. This second valve element 62 has two end sections 64a, 64b that are axially disposed opposite of each other and interspersed by a valve element channel 66, which opens at one end with the through openings 38 of the centralizer support 30, and which opens at its opposite end with an inlet 68 of the nozzle head 16. The second valve element channel 66 of the valve element 62 defines the fluid flow path of the second pinch valve section 20.

The wall area of the valve element 62 is also radially flexible with regard to the longitudinal axis. In this regard, the valve element 62 preferably has rubber-elastic properties throughout its full length.

In the neutral state, which is when no radial force is applied from the outside, the second valve element 62 has a configuration wherein the channel 66 of the valve element 62 is continuously open.

The hose-like first valve element 62 is coaxially enclosed within a rigid second pinch valve section housing 70. The housing 70 is a cylindrical member extending coaxially with the second valve element 62 along the length of the second pinch valve section 20. The second pinch valve section housing 70 also has a circumferential size matching the housing 56 of the first pinch valve section 18.

An actuating chamber 72 is defined between the outer radial surface of the second valve element 62 and an inner surface of the second housing 70. This actuating chamber 72 communicates with a second actuating fluid inlet 74 formed through the second housing 70. An actuating fluid supplied to the second actuating chamber 72 via the inlet 74 will increase pressure within the chamber, thereby causing the second elastic valve element 62 to collapse over itself and choke off the flow through the channel 66. As air pressure is relaxed the second valve element 62 returns to its neutral state allowing the fluid to continue its flow through the main channel 66.

The preferably flange-shaped end sections 64a, 64b of the valve element 62 are respectively received in annular recesses of the centralizer support 30 and the nozzle head in a fluid-tight manner to radially and axially seal the valve element. In this manner, a fluid-tight transition is provided between the channel 66 of the valve element 62 and both the through openings 38 of the centralizer support 30 and the inlet 68 of the nozzle head.

The second valve section housing 70 is connected at one end to the nozzle head 16. Such connection can be achieved via a press-fit connection over a boss formed in the nozzle head 16, or by any other suitable manner. As discussed above, the opposite end of the housing 70 is provided with a flange 26 having a sloped cam surface that engages an inner cam surface on the clamp 22 so that the two pinch valve sections can be clamped together in the axial direction.

Figure 5:
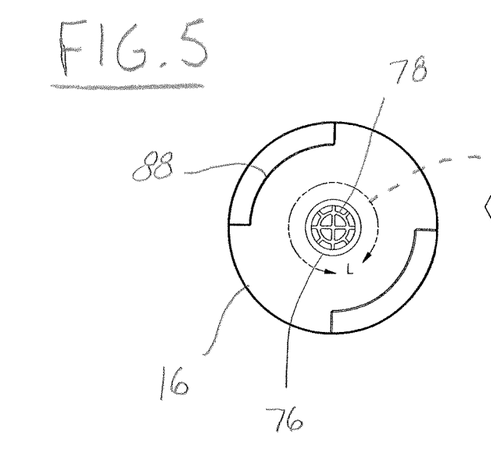
FIG. 5 is a detailed view of the nozzle of the multiple stage pinch valve shown in FIG. 1.
Figure 5A:
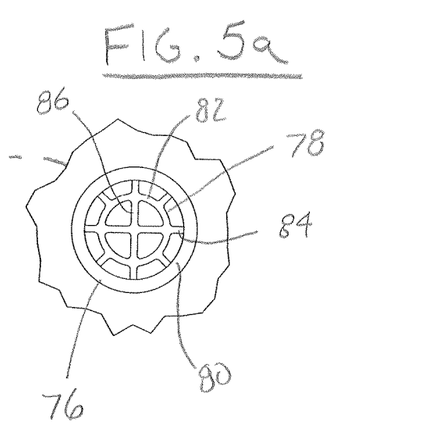
FIG. 5a is an enlarged view of the nozzle shown in FIG. 5.

As also shown in FIGS. 5 and 5a, the nozzle head 16 includes an outlet 76 opposite its inlet to allow fluid to exit the pinch valve 10. The outlet 76 is preferably provided with a streamliner element 78, which makes the fluid flow laminar prior to leaving the nozzle and pouring into the bottle during the filling process. FIGS. 5 and 5a show the detailed configuration of the coarse mesh streamliner 78, including an outer circular rim 80, an inner circular rim 82, outer ribs 84 connecting the outer rim to the inner rim and inner ribs 86 connecting the inner rim with the center of the streamliner body. The thickness of the outer rim 80 is on order of 2 mm and the thickness of the ribs 84, 86 and the inner rim 82 are on the order of 1 mm.

The bottom half 16a of the nozzle head 16 also preferably includes a quick disconnect bayonet-style joint 88, for releasable mounting of the clean-in-place cup 32, as described above.

Operation of the pinch valve can be described by comparing FIGS. 3a, 3b and 3c. FIG. 3a shows the position of both the first valve element 50 and the second valve element 62 in the relaxed state where no air pressure is applied through the respective inlets 60, 74. Thus, in the absence of compressed air, fluid enters the manifold inlet port 44 and passes through both the outer fluid flow channel 54 and the inner flow tube conduit 40 of the first valve section 18. The fluid from both the outer fluid flow channel 54 and the inner flow tube conduit 40 of the first valve section 18 then enters the flow channel 66 of the second pinch valve section.

When air is introduced into the space 58 between the first elastomeric valve element 50 and the first valve section housing 56 via the inlet 60 of the first valve section 18, the elastomeric valve element 50 collapses over the flow tube 24 and shuts off the flow component outside the tube, while the flow through the tube still continues, as shown in FIG. 3b. This results in a lower flow through the inner tube 40 only. This flow enters the flow channel 66 of the second pinch valve section 20 and ultimately exits the pinch valve 10 via the nozzle 76 of the nozzle head 16.

With air pressure maintained in the first pinch valve section actuating chamber 58, compressed air can then be introduced into the second pinch valve section 20 via its inlet 74 to urge the second valve element 72 into its closed position, as shown in FIG. 3c. In its closed position, the second pinch valve element 72 stops flow through its flow channel 66, thereby stopping all flow through the pinch valve 10.

A release of air pressure in each actuating chamber 58, 72 returns each elastic valve element 50, 62 to its neutral position, thereby opening fluid flow through their respective sections. Thus, the two-stage pinch valve arrangement of the present invention can be used for reliable step reduction or increase of the fluid flow through the valve 10.

Figure 6:
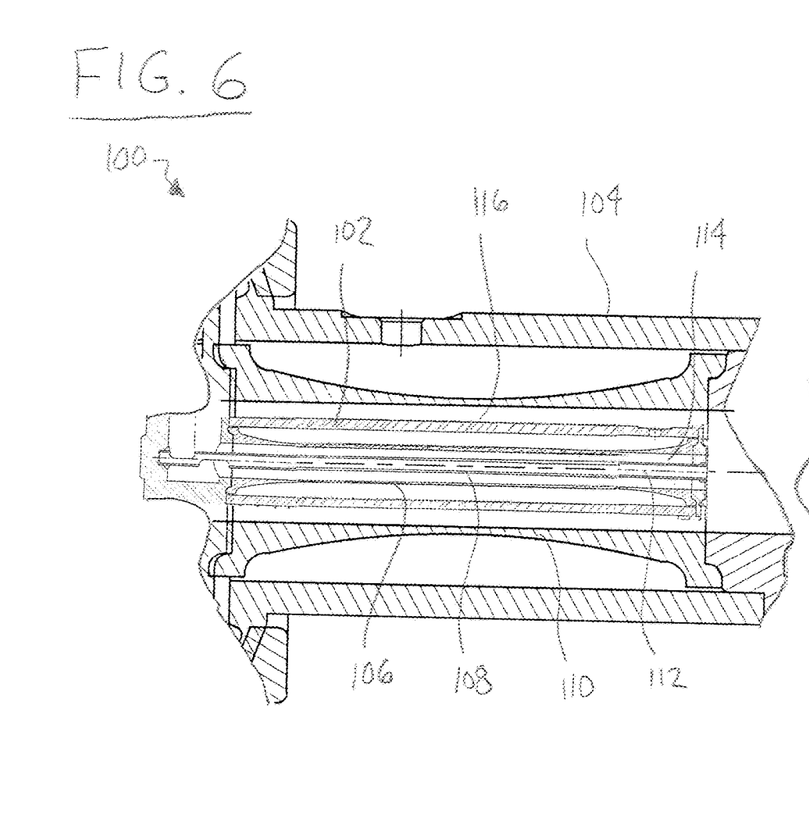
FIG. 6 is a cross-sectional view of a portion of a pinch valve according to an alternative embodiment of the present invention.

The step-wise flow control of the present invention can be further expanded by providing concentric pinch valve sections. For example, FIG. 6 shows a section of a pinch valve 100 having an inner pinch valve section 102 supported concentrically within an outer pinch valve section 104. The inner pinch valve section 102 includes an elastomeric valve element 106, which can be radially deformed to seal around an inner flow tube 108. The outer pinch valve section 104 includes an elastomeric valve element 110, which can be radially deformed to seal around the outer surface of the housing forming the inner pinch valve section 102.

With this arrangement, three flow paths 112, 114, 116 are provided. The inner flow path 112 is provided by the inner conduit of the inner flow tube 108. The middle flow path 114 is formed between the valve element 106 and the inner flow tube 108 of the inner valve section 102. The outer flow path 116 is formed between the valve element 110 of the outer pinch valve section 104 and the outer surface of the housing of the inner pinch valve section 102. This is also schematically represented in FIG. 6a.

Figure 6A:
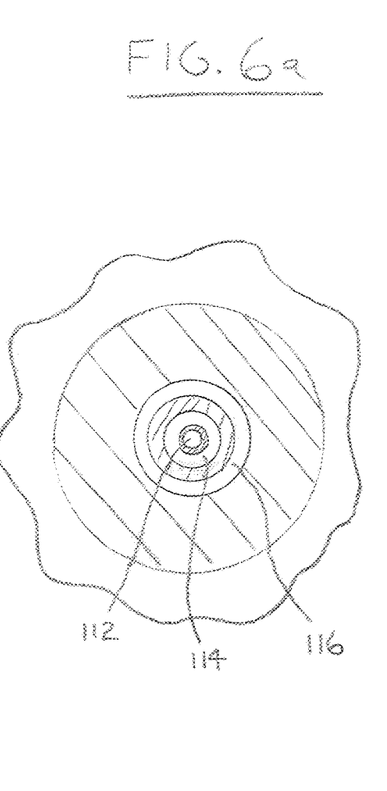
FIG. 6a is a schematic representation of the fluid flow paths provided according to the embodiment shown in FIG. 6.

In this embodiment, the concentric pinch valve sections provide a step-wise flow control. At any specific static head, changing the effective valve opening area creates different flows. In this configuration there are four flow steps as follows:

|        | Inner Section | Outer Section | Effective Flow  |
| ------ | ------------- | ------------- | --------------- |
| Step 1 | Closed        | Closed        | 112             |
| Step 2 | Closed        | Open          | 112 + 116       |
| Step 3 | Open          | Closed        | 112 + 114       |
| Step 4 | Open          | Open          | 112 + 114 + 116 |

Thus, if there are a total of N concentric pinch valves in a valve assembly, operating at a specific static head, then the valve control will be capable of modulating to 2N flow rates. For example if N=2, 4 different flow rates are possible, and with N=3 pinch valves, 8 flow rates are possible.

Figure 7:
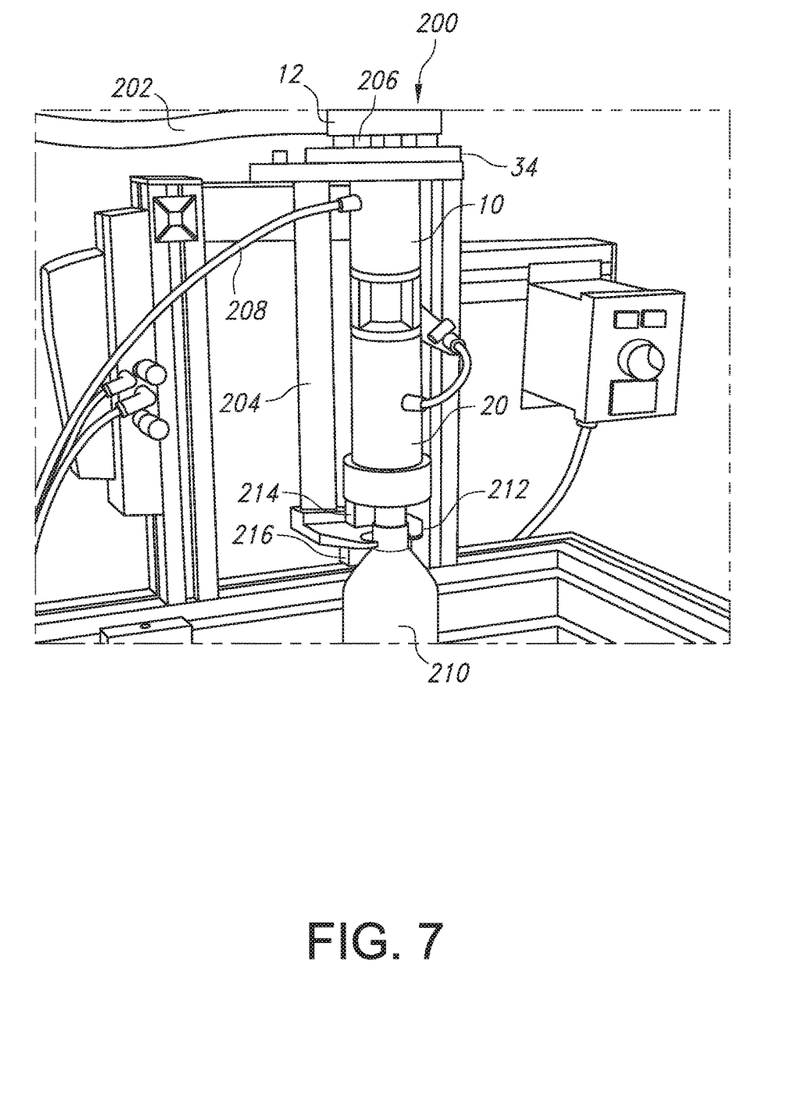
FIG. 7 shows an exemplary application of the pinch valve according to the present invention in use with a bottle filling system.

Turning now to FIG. 7, an exemplary application of the pinch valve according to the present invention in use with a bottle filling system is shown. A filling station 200 using the pinch valve 10 of the present invention is shown in FIG. 7. Incoming water is introduced into the manifold top head 12 through pipe 202. The manifold top head 12 is attached to the two-stage pinch valve body 14, by firm means, such as by shrink fit, as described above. The flange 34 of the pinch valve 10 is attached to the filling station post 204 by bolts 206 of food grade material, such as stainless steel. As described above, the bottom part of the valve body 14 contains the second pinch valve section 20, which stops the flow. The bottom part of the valve housing also contains a filling nozzle 16 with a streamliner mesh component, which generates laminar flow to prevent spill.

The pinch valve 10 is actuated by air pressure through a pneumatic inlet tube 208. Air supply can be provided through a manifold and inlet air tubes. Electrical control of air distribution is done through electric cables.

A bottle 210 is mounted to the filling station through a stationary clamping bracket 212. A sensor 214, such as a triangulation laser, detects existence of a bottle prior to filling activation. An additional sensor 216, such as a capacitance sensor, is also preferably used to detect fluid fill level.

Briefly, the filling process consists of a fast fill and a slow fill phase. The fast fill phase starts when the bottle-detecting sensor 214 confirms that there is a bottle 210 present at the filling station. Filling ends when the level sensor 216 is triggered at the end of the filling cycle.

More specifically, to start the filling process, the bottle 210 is placed in the clamping bracket 212 at the bottom of the filling station post 204. The bottle-detecting sensor 214 detects the presence of the bottle 210. A signal is then sent to a controller, such as a PLC, to start the process. The PLC responds with a signal to the main fluid shut off valve to open fluid flow at high rate through the pipe 202 into the top manifold head 12. At this point of the process, water flows down the tandem pinch valve 10 at a high flow rate with the first pinch valve section 1 and the second pinch valve section both in a fully open condition, as shown in FIG. 3a.

Before leaving the valve 10, turbulent water flowing through the two pinch valve sections enters the grate-like streamliner part 78, which is located below the second pinch valve section 20 in the outlet 76 of the nozzle head 16, and flows down from the nozzle as a laminar stream. As filling gets close to the desired fill level, the first pinch valve section 18 is actuated so that the first valve element 50 is pinched by air pressure against the rigid flow tube 24, thereby restricting the flow to that passing only through the flow tube inner conduit 40 at the center. This effect creates a reduced flow rate.

After some time, the reduced flow rate allows the rising level in the bottle 210 to stabilize and the air bubbles caused by fast-fill phase to surface, so that the level sensor 216 can detect the level and not get triggered prematurely. As the level sensor 216 detects the fluid at its target level, it sends a signal to the controller. The controller then commands the air source to provide compressed air to the second pinch valve section 20 to pinch close the second section flow channel 66 and thereby completely stop the flow of fluid. The bottle 210 is then ready to be removed from the filling station and the filling station is ready to accept the next bottle.

Figure 8:
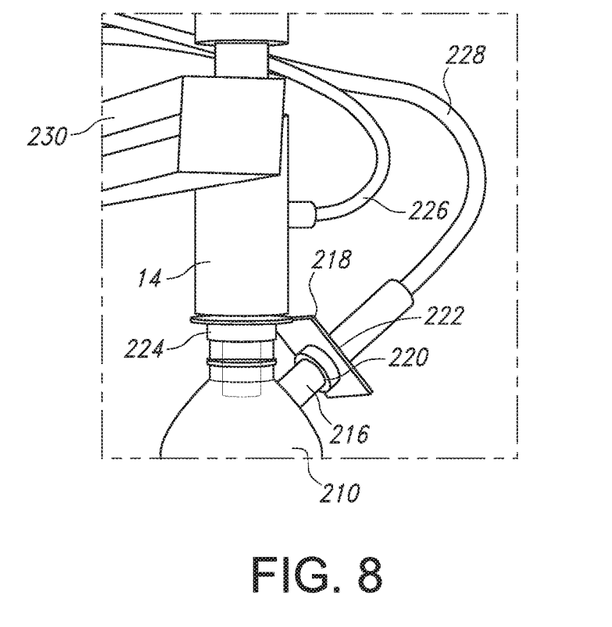
FIG. 8 is a detailed view of a bottle level sensor assembly.

FIG. 8 shows an example of a capacitive fluid fill level sensor 216, which may be used with the pinch valve 10 of the present invention. The sensor 216 is mounted to a mounting bracket 218. The connection of the fill level sensor 216 to the bracket 218 is done with a threaded stem 220. The threads of the threaded stem 220 allow an adjustment of the sensor 216 in proximity to a specific bottle size 210. After the proximity adjustment is made a lock nut 222 secures the fill level sensor 216 in place. Similarly, the bracket 219 is secured to the bottom of the cylindrical valve body 14 by threads 224. After the bracket level is set in its desired position for proper fill, the bracket 218 is then secured with a lock nut (not shown).

The pinch valve 10 is actuated by air pressure, which is provided through a pneumatic tube 226. As the fill sensor 216 detects proper fill level, a signal is sent through its cable 228 to the controller 230. The controller 230 then commands the pneumatic system of the filling station to activate the valve to let air flow through the pneumatic tube 226, such that the second pinch valve section 20 is activated and the flow of fluid, through both pinch valve sections stops.

Figure 9:
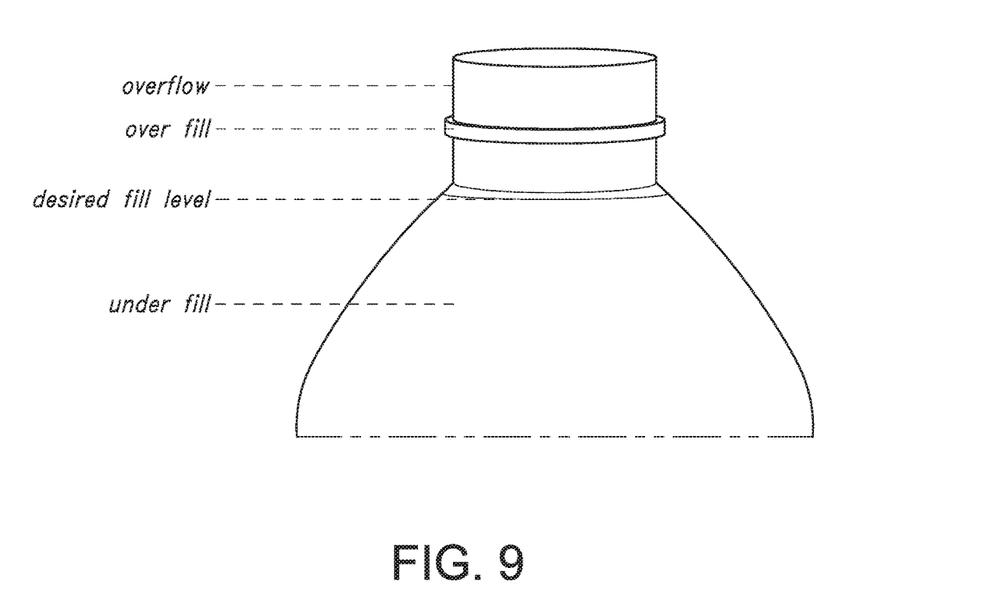
FIG. 9 shows the regions of fill levels for a typical bottle.

FIG. 9 shows the regions of fill levels for a typical bottle. The fill level accuracy of the pinch valve of the present invention is better than 1%. The present invention reduces the risk of an under fill, over fill and overflow, with its novel two stage actions. The first stage is a fast fill, with a turbulent flow, when the two pinch valve sections are fully open. The second stage is a slow laminar flow, which starts close to the desired fill level. During the time which it takes the flow to reach its final fill level, the bubbles in the bottle, which were generated from the turbulent flow, have time to rise to the top and exit the bottle. When the flow at the slow rate reaches its desired fill level, the second pinch valve section shuts off the flow completely. The result is a high precision filling process.

Although the preferred embodiments of the present invention have been described with reference to the accompanying drawing, it is to be understood that the invention is not limited to those precise embodiments, and that other changes and modifications may be made by one skilled in the art without departing from the scope or spirit of the invention.

What is claimed is:

1. A multiple stage pinch valve comprising a pinch valve body, a manifold top head connected to a proximal end of said pinch valve body and a nozzle head connected to a distal end of said pinch valve body, said pinch valve body comprising:

a first pinch valve section having a proximal end connected to said manifold top head and a distal end opposite said proximal end, said first pinch valve section including a tubular first valve element and a rigid flow tube supported within said first valve element, said rigid flow tube defining an inner fluid flow path and said first valve element and said rigid flow tube defining an outer fluid flow path therebetween, wherein said first valve element is deformable to radially seal around an outer surface of said rigid flow tube thereby closing said outer fluid flow path; and a second pinch valve section having a proximal end connected to said distal end of said first pinch valve section and a distal end, opposite said proximal end, connected to said nozzle head, said second pinch valve section including a tubular second valve element, said second valve element defining a fluid flow channel therein, said fluid flow channel communicating with said inner fluid flow path and said outer fluid flow path of said first pinch valve section, wherein said second valve element is radially deformable to close said fluid flow channel, wherein said rigid flow tube is supported at a proximal end thereof within said manifold top head, and wherein said manifold top head comprises a fluid inlet port and an interior fluid chamber communicating with said fluid inlet port, and wherein said rigid flow tube comprises at least one radial aperture formed through its circumferential wall adjacent said proximal end for providing fluid communication between said manifold top head fluid chamber and said inner fluid flow path within said rigid flow tube.

2. A multiple stage pinch valve as defined in claim 1, wherein said first pinch valve section is releasably coupled to said second pinch valve section.

3. A multiple stage pinch valve as defined in claim 2, wherein said pinch valve body further comprises a radial clamp, and wherein each of said distal end of said first pinch valve section and said proximal end of said second pinch valve section is provided with a flange having a sloped cam surface, said radial clamp engaging said cam surfaces to press said first and second pinch valve sections together in the axial direction.

4. A multiple stage pinch valve as defined in claim 1, wherein said pinch valve body further comprises a centralizer support supported between said first and second pinch valve sections, said centralizer support supporting a distal end of said rigid flow tube.

5. A multiple stage pinch valve as defined in claim 4, wherein said centralizer support is a generally circular disc-shaped element having an outer ring connected to a concentric inner ring via a plurality of radial ribs, said inner ring receiving said distal end of said rigid flow tube, and wherein at least one flow opening is provided through said centralizer support to permit fluid flow between said outer fluid flow path of said first pinch valve section and said fluid flow channel of said second pinch valve section.

6. A multiple stage pinch valve as defined in claim 1, wherein said interior fluid chamber of said manifold top head further communicates with said outer fluid flow path defined in said first pinch valve section.

7. A multiple stage pinch valve as defined in claim 1, wherein each of said first and second valve elements is radially deformable by an application of compressed air between an inner surface of said pinch valve body and an outer radial surface of said respective valve element.

8. A multiple stage pinch valve as defined in claim 1, wherein each of said first and second valve elements is elastically deformable between a neutral state for permitting a fluid flow and a closed state for stopping a fluid flow.

9. A multiple stage pinch valve as defined in claim 1, wherein said nozzle head comprises an outlet and a coarse mesh streamliner supported in said outlet, said outlet being in fluid communication with said fluid flow channel of said second pinch valve section and said streamliner comprising an outer circular rim, an inner circular rim and a plurality of radial ribs defining a plurality of openings through said streamliner for providing a laminar flow of fluid out of said nozzle head.

10. A method for controlling fluid flow through a multiple stage pinch valve as defined in claim 1, the method comprising:
   allowing fluid to flow through the inner and outer fluid flow paths of the first pinch valve section and through the fluid flow channel of the second pinch valve section to create a fast flow rate of fluid through the valve;
   deforming the first valve element to radially seal around the outer surface of the rigid flow tube, thereby closing the outer fluid flow path of the first pinch valve section, wherein fluid is still permitted to flow through the inner fluid flow path of the first pinch valve section and through the fluid flow channel of the second pinch valve section to create a slow flow rate of fluid through the valve, said slow flow rate being less than said fast flow rate; and
   deforming the second valve element to close the fluid flow channel in the second pinch valve section to stop all fluid flow through the valve.

11. A bottle filling apparatus comprising a multiple stage pinch valve as defined in claim 1, a source of fluid connected to said manifold top head, a source of compressed air connected to said pinch valve body for activating said valve elements and a bottle clamping bracket disposed adjacent said nozzle head for positioning a bottle for filling.

12. A bottle filling apparatus as defined in claim 11, further comprising a bottle detection sensor positioned at said bottle clamping bracket for detecting the presence of a bottle in said bracket.

13. A bottle filling apparatus as defined in claim 11, further comprising a bottle fill sensor positioned at said bottle clamping bracket for detecting a level of fluid within a bottle held in said bracket.

14. A multiple stage pinch valve comprising a pinch valve body, a manifold top head connected to a proximal end of said pinch valve body and a nozzle head connected to a distal end of said pinch valve body, said pinch valve body comprising:
   an inner pinch valve section having a proximal end connected to said manifold top head and a distal end opposite said proximal end, said inner pinch valve section including a housing, a tubular inner valve element supported coaxially within said housing, and a rigid flow tube supported coaxially within said inner valve element, said rigid flow tube defining an inner fluid flow path and said inner valve element and said rigid flow tube defining a middle fluid flow path therebetween, wherein said inner valve element is deformable to radially seal around an outer surface of said rigid flow tube, thereby closing said middle fluid flow path; and
   an outer pinch valve section disposed coaxially around said inner pinch valve section, said outer pinch valve section having a proximal end connected to said manifold top head and a distal end opposite said proximal end, said outer pinch valve section including a tubular outer valve element defining an outer fluid flow path between an inner surface of said outer valve element and an outer surface of said inner pinch valve section housing, wherein said outer valve element is deformable to radially seal around the outer surface of said inner pinch valve section housing, thereby closing said outer fluid flow path,
   wherein said rigid flow tube is supported at a proximal end thereof within said manifold top head, and
   wherein said manifold top head comprises a fluid inlet port and an interior fluid chamber communicating with said fluid inlet port, and wherein said rigid flow tube comprises at least one radial aperture formed through its circumferential wall adjacent said proximal end for providing fluid communication between said manifold top head fluid chamber and said inner fluid flow path within said rigid flow tube.

15. A multiple stage pinch valve as defined in claim 14, wherein said pinch valve body further comprises a downstream pinch valve section having a proximal end connected at said distal end of said outer pinch valve section and a distal end, opposite said proximal end, connected to said nozzle head, said downstream pinch valve section including a tubular downstream valve element defining a fluid flow channel therein, said fluid flow channel communicating with said inner and middle fluid flow paths of said inner pinch valve section and said outer fluid flow path of said outer pinch valve section, wherein said downstream valve element is radially deformable to close said fluid flow channel.

* * * * *